Jan. 11, 1966          G. G. OLIVATI          3,229,088
DEVICE FOR OBTAINING COMPLETE DISCONTINUOUS
PANORAMIC SERIOGRAPHY OF DENTAL ARCHES
Filed Sept. 20, 1963                                    3 Sheets-Sheet 1

INVENTOR
GIAN GIACOMO OLIVATI
BY
Stevens, Davis, Miller & Mosher
ATTORNEYS

United States Patent Office 3,229,088
Patented Jan. 11, 1966

3,229,088
DEVICE FOR OBTAINING COMPLETE DISCONTINUOUS PANORAMIC SERIOGRAPHY OF DENTAL ARCHES
Gian Giacomo Olivati, Via Lamarmora 77, Torino, Italy
Filed Sept. 20, 1963, Ser. No. 310,405
Claims priority, application Italy, Sept. 28, 1962,
Patent 676,017
3 Claims. (Cl. 250—50)

It is an object of the present invention to provide a device to be applied to any apparatus embodying a ray-generating tube, to permit the obtaining of radiographs of entire dental arches, upper and lower, on plates placed in extra-oral position.

To attain that object, with a source of rays and a surface sensitive thereto, both placed outside the patient's skull, it is necessary that the latter should be enabled to rotate with respect to the direction of the beam of rays in such a way as to interpose on their path successive sectors of the dental arch. It has been found, however, that the shape of the arch is such that the rotation of the skull around a vertical axis would not allow one to attain the desired object because it is not possible to obtain correct radiographs with beams of rays having directions all passing through one same point.

This fact is mainly due to the variable curvature of the dental arch, which cannot be assimilated to an arc of a circle. Therefore it would not be possible to keep an approximate perpendicularity between the sector of the arch and the beam of rays and one would get super-impositions due to overlapping of the two ends of the arch.

The problem is solved according to the present invention by constraining the patient's skull to become displaced according to two freedoms of movement, one of rotation around a vertical axis, the other one translatory along a direction parallel to the horizontal axis of symmetry of the dental arch. Consequently the device according to the invention comprises a support to be fixed onto a ray-generating tube and carrying a plate-support and, between the latter and the ray-generating tube, a container for the patient's head. Said container is rotatable about a vertical axis and said vertical axis is horizontally movable.

Figure 1:
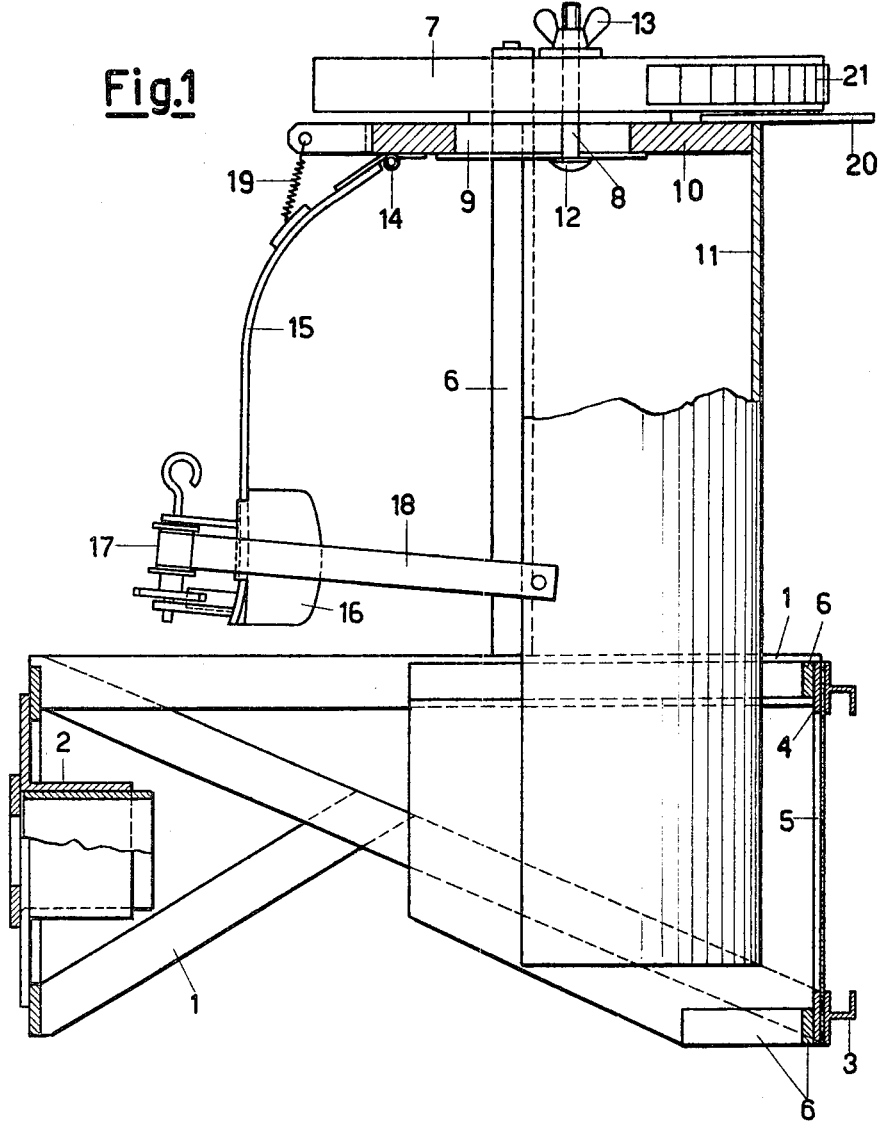
Figure 2:
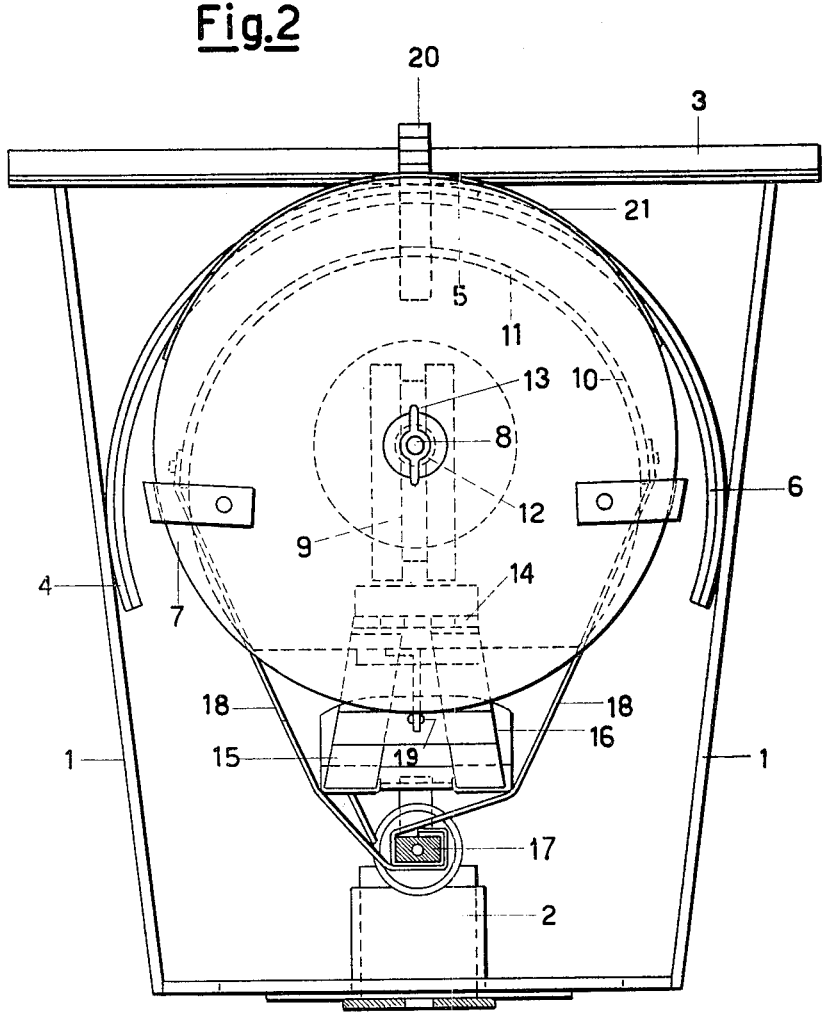
Figure 3:
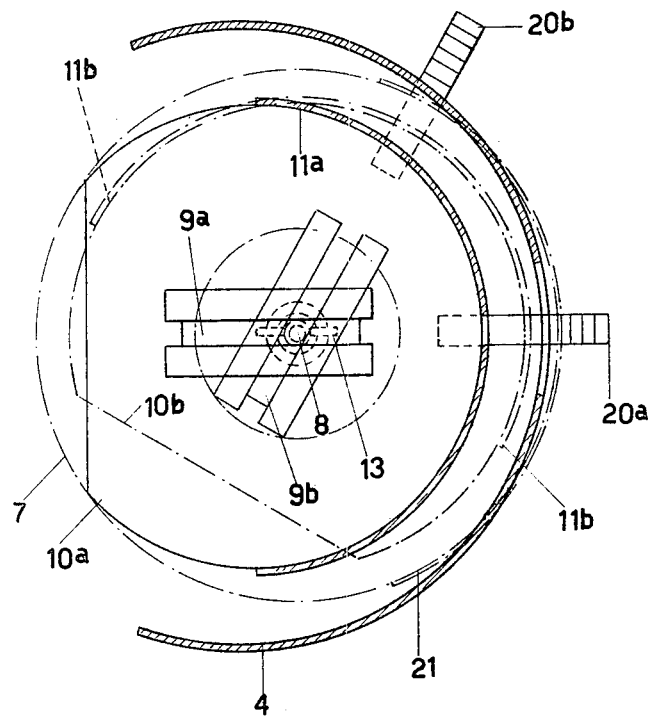

In order to make more fully clear how the invention is embodied, an example of embodiment thereof is described hereinafter with reference to the accompanying drawings in which:

FIG. 1 is a side-view;
FIG. 2 is a top plan view of FIG. 1;
FIG. 3 shows diagrammatically how the rotary-translatory displacement takes place.

In the drawings, by 1 is indicated a framing, which may be of any appropriate structure and shape, to be connected by any means to the part 2 of the ray-generating apparatus. In front of the framing 1 there is fixed a plate-carrier 3 adapted to contain the sensitive plate, not represented, with the possibility of making it slide longitudinally before a screen 4 of head, which too is carried by the framing 1 and provided with a window 5 that finds itself in a position opposite the aforesaid part 2 in such a way as to find itself in the path of the rays emitted by the apparatus.

Two uprights 6 are fixed to the intermediate part of framing 1 and extend upward and rigidly support a disk shaped piece 7. Pin 8 is provided with a head 12 and a tightening nut 13 and passes through disk piece 7 and slot 9 of flat piece 10. The latter supports a depending curved screen 11. Pin 8 functions to movably support piece 10 and secure piece 10 against disk 7 when nut 13 is tightened. To the piece 10 is hinged at 14 a depending curved rod 15 which at its lower end carries a yielding cushion 16 and a member 17 of any suitable kind adapted to exert a traction upon a flexible member 18 fixed to the screen 11 in such a way as to displace the rod 15 in opposition to the bias of spring 19.

To the piece 10 there is fixed in front a list 20, provided with lengthwise graduations, which projects from the disc 7; the latter is provided at its front part with a graduated scale 21 extending over a sector of its front border.

The above-described device is employed in the following way. The patient's head is introduced into the cylindrical sector 11 against which it is held to adhere by the cushion 16 slightly pressed against the neck by means of the member 17 and the flexible members 18.

Thus the head is made to rotate around the axis 8 in such a way as to present in front of the window 5 successive sectors of the dental arch. The axis of rotation 8 however is displaceable with respect to the piece 10 and to the screen 11, namely with respect to the patient's head and, therefore, it is possible to obtain the optimal incidence of the beam of rays upon the sector of dental arch which is of interest at the moment, taking into account also the greater or smaller size of the head, or the particular curvature of the dental arch in every individual case. After each taking of a sector, the patient's head is readjusted and held in position due to the tightening of nut 13. Then the next sector is taken.

In FIGURE 3 are indicated by indices $a$ and $b$ two distinct positions of the movable parts 9, 10, 11, 20. It is possible so to obtain on the plate the complete series of radiographs reproducing by successive sectors the entire dental arches, upper and lower.

The embodiment herein described is merely by way of example and the invention may be embodied also in different shapes, without departing from the scope of the present invention.

What is claimed is:

1. An apparatus for taking a series of separate, successive radiographs of successive sectors of a predetermined portion of a patient's mouth comprising a framework adapted to fit about a patient's head, plate carrier means mounted at the front of said framework at mouth level, alignment means mounted at the rear of said framework adapted to engage and align an X-ray projector in fixed position with respect to said plate carrier means, a container means movably mounted within said framework for immovably engaging the patient's head, interconnecting means connected between said container means and said framework for enabling rotation after each radiograph of said container means about a vertical axis and said container means being transversely movable after each radiograph relative to said framework, said container means being movable in such a way so that the patient's head can assume for each successive radiograph different angle and transverse positions with respect to said X-ray source and the plate carrier means whereby the X-ray beam from the X-ray source is adapted to be positioned substantially perpendicular to the particular sector being taken, and means mounted on said framework for locking the container means in predetermined position relative to said framework.

2. An apparatus as set forth in claim 1 wherein said container means comprises a top disc, a cylindrical screen depending from the forward edge of said disc, a depending rod resiliently mounted to the rear of said disc, a cushion supported on the bottom of said rod and adapted to fit against the back of the patient's head, and a flexible strap member connected between the lower end of said rod and said screen, whereby inadvertent movement of the patient's head with respect to said container is prevented.

3. An apparatus as set forth in claim 2, wherein said disc has an elongated open slot, said interconnecting means comprising a vertical pin held in said framework, said pin extending through the slot in said disc, said locking means comprising a nut threadedly secured to said pin for selectively and releasably locking said container means and framework in rigid engagement, and said apparatus further comprising indicating means partially mounted on said disc and partially mounted on said framework for indicating the relative positions between said container means and said framework.

References Cited by the Examiner

UNITED STATES PATENTS

| | | | |
|---|---|---|---|
| 2,798,959 | 7/1957 | Hudson | 250—61.5 |
| 2,976,417 | 3/1961 | Freeman | 250—69 X |
| 3,045,118 | 7/1962 | Hollman | 250—61.5 |

RALPH G. NILSON, *Primary Examiner.*

HENRY S. MILLER, GUY E. MATTHEWS, WILLIAM F. LINDQUIST, *Assistant Examiners.*